US010622875B2

(12) United States Patent
Fatemi et al.

(10) Patent No.: US 10,622,875 B2
(45) Date of Patent: Apr. 14, 2020

(54) INTERIOR PERMANENT MAGNET ELECTRIC MACHINE

(71) Applicant: GM GLOBAL TECHNOLOGY OPERATIONS LLC, Detroit, MI (US)

(72) Inventors: Alireza Fatemi, Pontiac, MI (US); Lei Hao, Troy, MI (US); Thomas W. Nehl, Shelby Township, MI (US); Chandra S. Namuduri, Troy, MI (US); Norman K. Bucknor, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 408 days.

(21) Appl. No.: 15/616,511

(22) Filed: Jun. 7, 2017

(65) Prior Publication Data
US 2018/0358876 A1     Dec. 13, 2018

(51) Int. Cl.
*H02K 21/14* (2006.01)
*H02K 21/12* (2006.01)
*H02K 1/16* (2006.01)
*H02K 1/27* (2006.01)
*H02K 1/02* (2006.01)

(52) U.S. Cl.
CPC ............ *H02K 21/145* (2013.01); *H02K 1/02* (2013.01); *H02K 1/16* (2013.01); *H02K 1/276* (2013.01); *H02K 1/2766* (2013.01); *H02K 21/14* (2013.01); *H02K 2213/03* (2013.01)

(58) Field of Classification Search
CPC ...... H02K 21/145; H02K 21/14; H02K 21/12; H02K 21/125; H02K 1/16; H02K 1/165; H02K 1/276; H02K 1/274; H02K 1/27; H02K 1/2766
See application file for complete search history.

(56) References Cited

U.S. PATENT DOCUMENTS

| 7,705,503 | B2* | 4/2010 | Takahashi | H02K 1/32 310/156.53 |
|---|---|---|---|---|
| 7,791,236 | B2* | 9/2010 | Liang | H02K 1/2766 310/156.07 |
| 8,461,739 | B2* | 6/2013 | Liang | H02K 1/165 310/193 |
| 8,487,495 | B2* | 7/2013 | Takizawa | H02K 1/276 310/156.01 |
| 8,664,822 | B2* | 3/2014 | Vyas | H02K 1/2766 310/156.39 |

(Continued)

*Primary Examiner* — Edgardo San Martin
(74) *Attorney, Agent, or Firm* — Quinn IP Law

(57) ABSTRACT

An IPM electric machine includes a rotor, rotor shaft stator, and permanent magnets. The rotor includes rare earth permanent magnets disposed within pockets. The rotor, the pockets and the permanent magnets conform to a first set of geometric design parameters. The stator includes radially-inwardly projecting teeth that form slots between pairs of the teeth. Electrical windings are disposed within slots of the laminate stack. The teeth and slots conform to a second set of geometric design parameters. The quantity of slots is between 60 and 96, the quantity of electrical poles is between 6 and 12, the quantity of electrical phases is between 3 and 6 and the electrical windings include a quantity of turns per phase that is between 8 and 20. A ratio of an outer diameter of the stator to an active length of the rotor is between 2 and 3.5.

17 Claims, 4 Drawing Sheets

(56) References Cited

U.S. PATENT DOCUMENTS

| | | | | |
|---|---|---|---|---|
| 8,664,823 | B2* | 3/2014 | Vyas | H02K 1/2766 |
| | | | | 310/156.53 |
| 9,407,116 | B2* | 8/2016 | Kondou | H02K 1/276 |
| 9,479,017 | B2* | 10/2016 | Hao | H02K 1/2766 |
| 9,925,889 | B2* | 3/2018 | Hao | B60L 11/1868 |
| 10,184,442 | B2* | 1/2019 | Hao | H02K 1/276 |
| 10,348,144 | B2* | 7/2019 | Oketani | |
| 2004/0108789 | A1* | 6/2004 | Marshall | H02K 1/24 |
| | | | | 310/216.016 |
| 2010/0117475 | A1* | 5/2010 | Leonardi | H02K 1/2766 |
| | | | | 310/156.47 |
| 2011/0169369 | A1* | 7/2011 | Liang | H02K 1/16 |
| | | | | 310/216.092 |
| 2017/0338706 | A1* | 11/2017 | Hao | F02N 11/00 |
| 2019/0027977 | A1* | 1/2019 | Saito | H02K 3/04 |

* cited by examiner

INTERIOR PERMANENT MAGNET ELECTRIC MACHINE

INTRODUCTION

Electric motor/generators, e.g., interior permanent magnet (IPM) machines can be employed as torque generative devices on vehicles.

SUMMARY

A multi-phase, multi-pole interior permanent magnet motor/generator (IPM electric machine) is described, and includes a rotor disposed on a rotor shaft within an annular stator, and a plurality of permanent magnets disposed in the rotor, wherein the stator includes a stator core and electrical windings arranged in a distributed winding configuration. The rotor includes a plurality of pockets that are disposed near an outer periphery of the rotor, and the permanent magnets are disposed within the pockets. The permanent magnets are composed from rare earth materials. The rotor, the pockets and the permanent magnets conform to a first set of geometric design parameters. The stator includes a plurality of radially-inwardly projecting teeth that are configured to form inwardly-opening slots between adjacent pairs of the teeth. The teeth and slots conform to a second set of geometric design parameters. The electrical windings are disposed within the slots of the laminate stack. The first and second sets of geometric design parameters are selected to achieve motor operating parameters comprising a high drive-cycle efficiency over a wide operational range, a high torque density, a wide peak power range, a maximum speed of 18000 rpm and minimize magnet material mass.

An aspect of the disclosure includes a quantity of slots being between 60 and 96, the quantity of electrical poles is between 6 and 12, the quantity of electrical phases being between 3 and 6 and the electrical windings include a quantity of turns per phase that is between 8 and 20. A normalized characteristic current of each phase of the distributed winding configuration is between 0.35 and 0.7 in relation to peak current. A remnant flux density of the permanent magnets is greater than 0.1 T, and a ratio of an outer diameter of the stator to an active length of the rotor is between 2 and 3.5.

An aspect of the disclosure includes the first and second sets of geometric design parameters being selected to achieve motor operating parameters that include a high drive-cycle efficiency over a wide operational range, a high torque density, a wide peak power range, a maximum speed of 18000 rpm and minimize magnet material mass.

Another aspect of the disclosure includes the second set of geometric design parameters associated with the stator including a split ratio, a tooth width ratio, a tooth tip length ratio and a yoke ratio associated with radially inwardly projecting teeth of the stator.

Another aspect of the disclosure includes the split ratio having a magnitude between 0.60 and 0.67, the tooth width ratio having a magnitude between 0.53 and 0.60, the tooth tip length ratio having a magnitude between 0.11 and 0.45, and the yoke ratio having a magnitude between 0.08 and 0.14.

Another aspect of the disclosure includes each of the permanent magnets being a rectangular prism having a longitudinal axis and a rectangular cross-sectional area having a major axis and a minor axis, wherein each of the plurality of pockets is disposed orthogonal to a radial line of the rotor and disposed to accommodate one of the permanent magnets and wherein each of the permanent magnets is disposed in a respective one of the pockets such that its major axis is orthogonal to the radial line of the rotor.

Another aspect of the disclosure includes the first set of geometric design parameters associated with the rotor including a permanent magnet burial ratio, a q-axis width ratio, a permanent magnet height ratio, and a pole coverage ratio.

Another aspect of the disclosure includes the permanent magnet burial ratio being between 1.75 and 6.67, the q-axis width ratio being between 0.5 and 0.69, the permanent magnet height ratio being between 0.21 and 0.30, and the pole coverage ratio being between 0.57 and 0.73 when the IPM electric machine is arranged as an 8-pole device and the stator includes 96 slots.

Another aspect of the disclosure includes the permanent magnet burial ratio being between 1.86 and 7.10, the q-axis width ratio being between 0.52 and 0.74, the permanent magnet height ratio being between 0.35 and 0.62, and the pole coverage ratio being between 0.63 and 0.68 when the IPM electric machine is arranged as a 12-pole device and the stator includes 72 slots.

Another aspect of the disclosure includes the permanent magnet burial ratio being between 1.70 and 9.67, the q-axis width ratio being between 0.51 and 0.72, the permanent magnet height ratio being between 0.27 and 0.59, and the pole coverage ratio being between 0.61 and 0.67 when the IPM electric machine is arranged as a 10-pole device and the stator includes 60 slots.

Another aspect of the disclosure includes the permanent magnets being arranged in a V-configuration such that an apex of the V-configuration is disposed on a radial line of the rotor and wherein the major axis of the permanent magnet is disposed at an acute angle relative to the radial line and the outer periphery of the rotor.

Another aspect of the disclosure includes the first set of geometric design parameters associated with the rotor including a permanent magnet burial ratio, a permanent magnet width ratio, a q-axis width ratio, a permanent magnet height ratio, and a pole coverage ratio, wherein the permanent magnet burial ratio is between 0.25 and 0.48, the permanent magnet width ratio is between 0.85 and 0.93, the q-axis width ratio is between 0.52 and 0.87, the permanent magnet height ratio is between 8.73 and 14.10, and the pole coverage ratio is between 0.63 and 0.75 when the IPM electric machine is arranged as an 8-pole device, and the stator includes 96 slots.

Another aspect of the disclosure includes the IPM electric machine being arranged as a 12-pole device, and the stator including 72 slots, and wherein the first set of geometric design parameters associated with the rotor includes a permanent magnet burial ratio between 0.30 and 0.44 the permanent magnet width ratio is between 0.83 and 0.92, the q-axis width ratio between 0.50 and 0.88, the permanent magnet height ratio between 8.76 and 12.54, and the pole coverage ratio between 0.61 and 0.66.

Another aspect of the disclosure includes the IPM electric machine being arranged as a 10-pole device, and the stator includes 60 slots, and wherein the first set of geometric design parameters associated with the rotor includes the permanent magnet burial ratio between 0.31 and 0.44, the permanent magnet width ratio between 0.88 and 0.93, the q-axis width ratio between 0.52 and 0.89, the permanent magnet height ratio between 8.66 and 13.34, and the pole coverage ratio between 0.62 and 0.67.

Another aspect of the disclosure includes the slots between adjacent teeth in the stator being rectangularly-shaped.

Another aspect of the disclosure includes the slots between adjacent teeth in the stator being trapezoidally-shaped.

Another aspect of the disclosure includes the IPM electric machine having a saliency ratio within a range between 1.5 and 3.0.

Another aspect of the disclosure includes the rotor including a plurality of laminate sheets that are disposed on the rotor shaft, wherein the plurality of laminate sheets include a plurality of voids that are disposed near an outer periphery of the rotor, and wherein the voids form the plurality of pockets.

Another aspect of the disclosure includes the pockets including a plurality of parabolically-shaped cavities adjacent to edge portions of the permanent magnet disposed therein, wherein each of the cavities has a depth that is 10-20% of the minor axis length of the magnet, and a length that is 15-30% of the major axis length of the permanent magnet.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various selected features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms may be used with respect to the drawings. Directional terms are not to be construed to limit the scope of the disclosure. Furthermore, the disclosure, as illustrated and described herein, may be practiced in the absence of an element that is not specifically disclosed herein.

Figure 1:
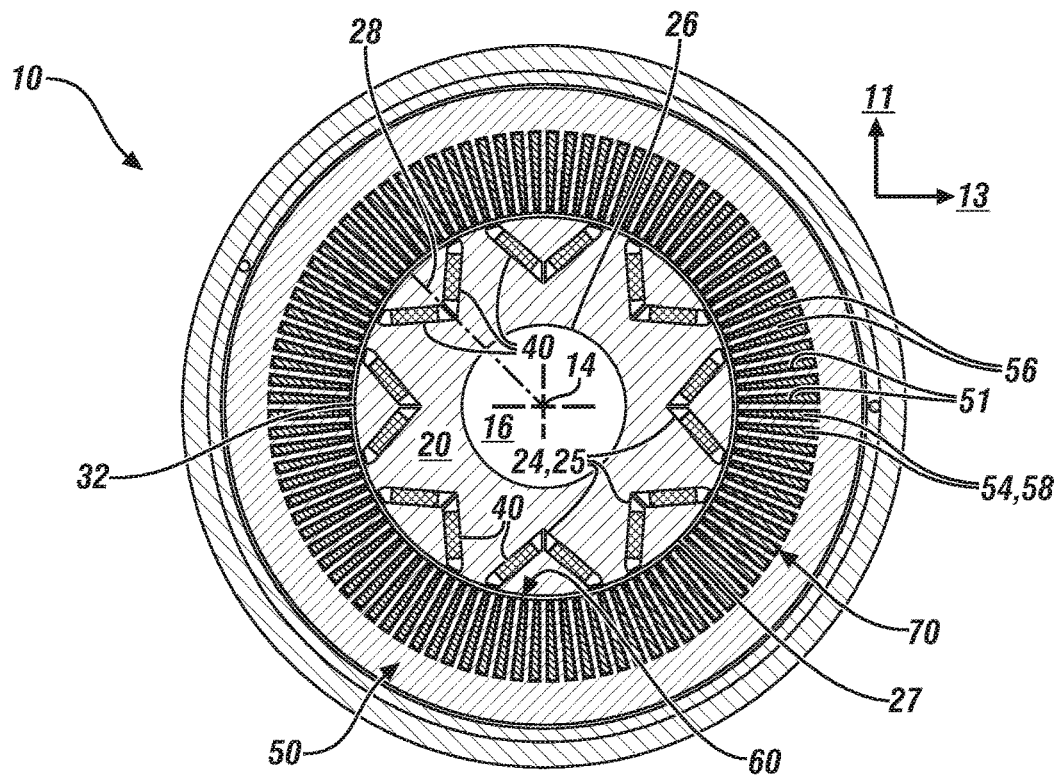
FIG. 1 schematically illustrates a cut-away end view of an embodiment of an interior permanent magnet (IPM) electric motor/generator (electric machine), in accordance with the disclosure.
Figure 2:
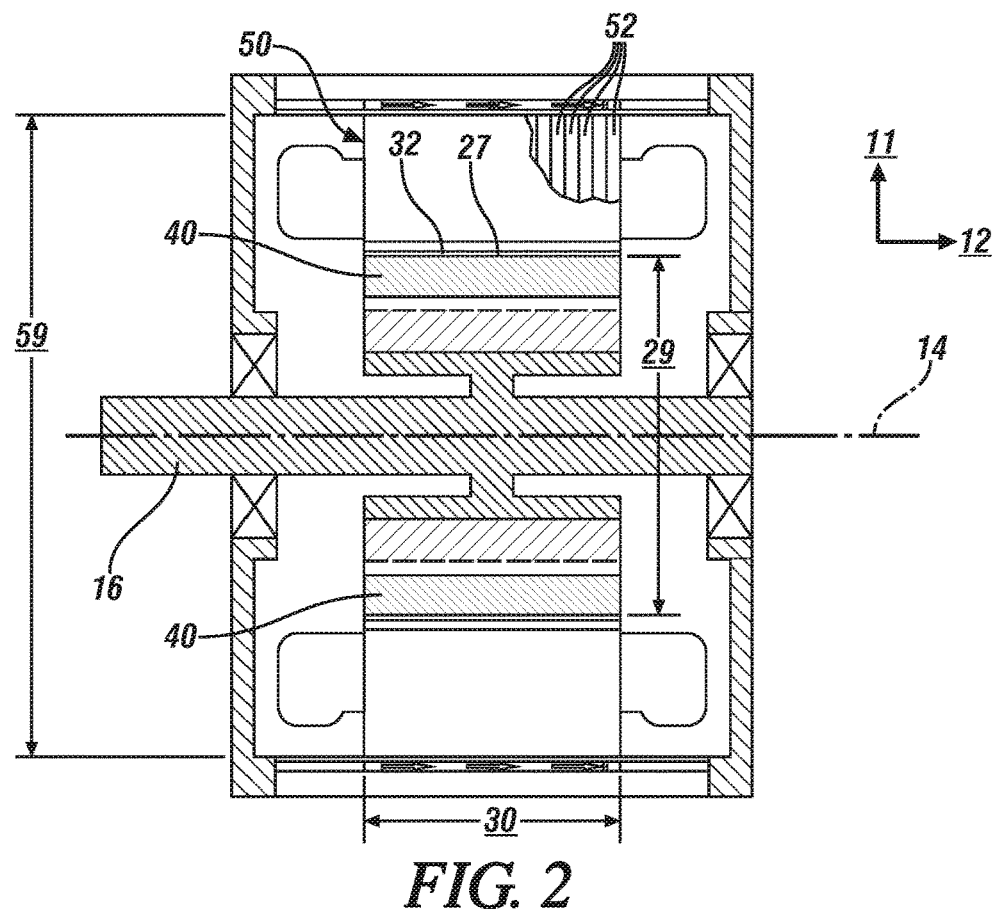
FIG. 2 schematically illustrates a cross-sectional cut-away side view of an embodiment of an IPM electric machine, in accordance with the disclosure.

Referring to the drawings, wherein like reference numerals correspond to like or similar components throughout the several Figures, FIGS. 1 and 2, consistent with embodiments disclosed herein, illustrate an interior permanent magnet (IPM) electric motor/generator (electric machine) 10 that may be employed as part of a powertrain system that provides tractive effort in a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The schematic views of the IPM electric machine 10 are described with reference to an elevation axis 11, a longitudinal axis 12 and a radial axis 13.

The IPM electric machine 10 includes a cylindrically-shaped rotor 20 that is disposed within an annularly-shaped stator 50, wherein the rotor 20 is coaxial with a rotor opening 60 that is formed in the stator 50. Other elements of the IPM electric machine 10, e.g., end caps, shaft bearings, electrical connections, etc., are included but not shown.

The rotor 20 includes a plurality of stamped, ferrous laminate sheets (not shown) that are arranged in a stack and assembled onto a rotor shaft 16, which includes an axis of rotation 14 that is parallel with the longitudinal axis 12. Each of the laminate sheets is a disk-shaped device formed with a uniform thickness and a constant diameter, and has a centrally-located shaft aperture 26 and a plurality of voids 24 that are equidistantly distributed about a circumference near an outer periphery 27 thereof. The laminate sheets are arranged in a stack such that the shaft apertures 26 are aligned and the voids 24 are aligned. The aligned voids 24 form a plurality of pockets 25 that are oriented parallel to the longitudinal axis 12. Additional details related to the voids 24 and pockets 25 are described in greater detail with reference to FIGS. 5, 6 and 7. The rotor shaft 16 is inserted into the aligned shaft apertures 26 to form a rotor body.

The rotor 20 also includes a plurality of permanent magnets 40, with one of the permanent magnets 40 disposed in each of the pockets 25. Each of the permanent magnets 40 is preferably a rare-earth magnet that has been configured as a rectangular prism that can be described in terms of a longitudinal axis and a rectangular cross-sectional area having a major axis and a minor axis. A rare-earth magnet is formed from alloys of rare-earth materials, such as dysprosium-reduced material or another suitable material. Other rare-earth materials may include neomydium and samarium.

External dimensions associated with the rotor 20 include an outer diameter 29 and an active rotor length 30. The outer diameter 29 is associated with the outer periphery 27, and is measured in relation to the radial axis 13, and the active rotor length 30 is associated with a length of the stack of laminate sheets as measured in relation to the longitudinal axis 12.

Pairs of the permanent magnets 40 as disposed in the pockets 25 are arranged in a V-configuration and are symmetric to and at equal angles to a pole axis 28 in this embodiment. As shown, the rotor 20 is arranged as an 8-pole device, with sixteen permanent magnets 40 arranged in 8 pole-pairs that are disposed in relation to eight pole axes 28, a single one of which is shown.

Figure 3:
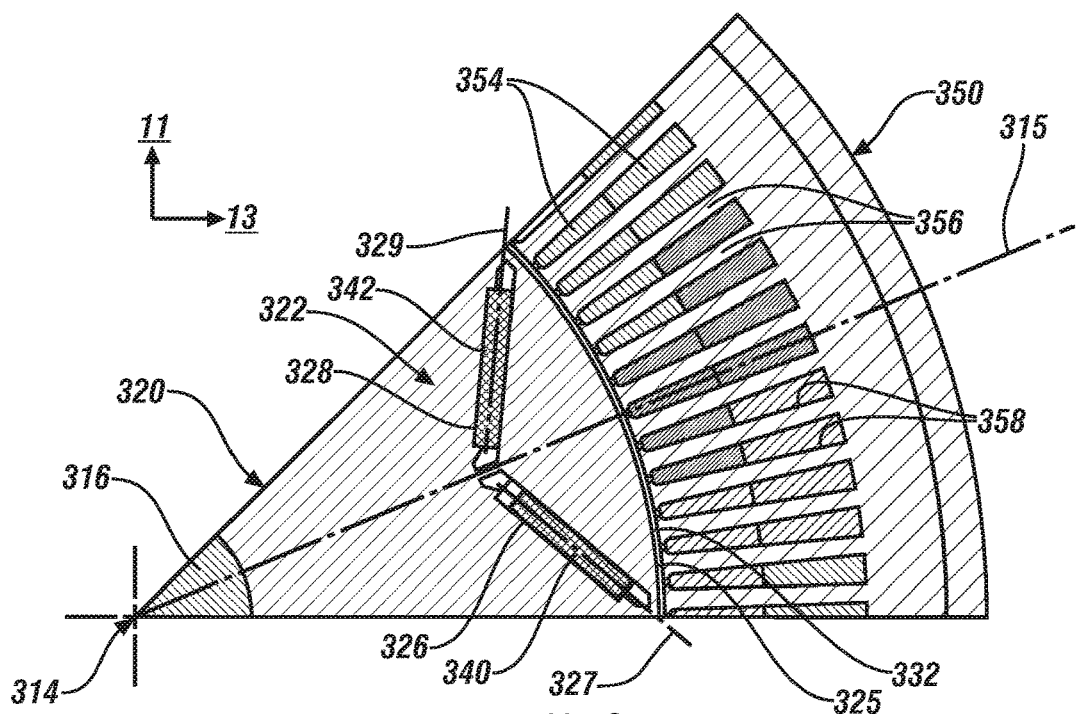
FIG. 3 is a schematic cross-sectional cut-away end view of a fragment of an embodiment of the IPM electric machine, in accordance with the disclosure.
Figure 4A:
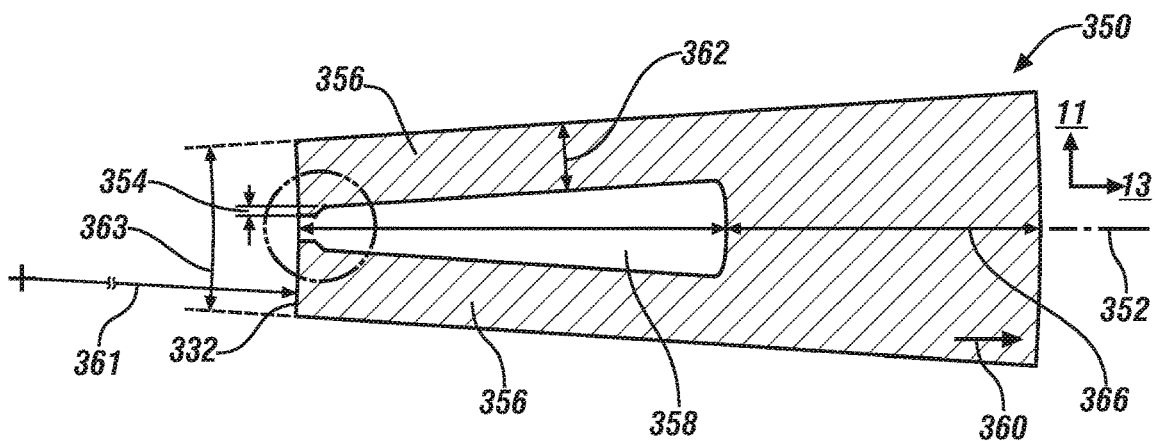
FIGS. 4A and 4B are schematic cross-sectional cut-away end views of a fragment of a stator for an embodiment of the IPM electric machine, in accordance with the disclosure.
Figure 4B:
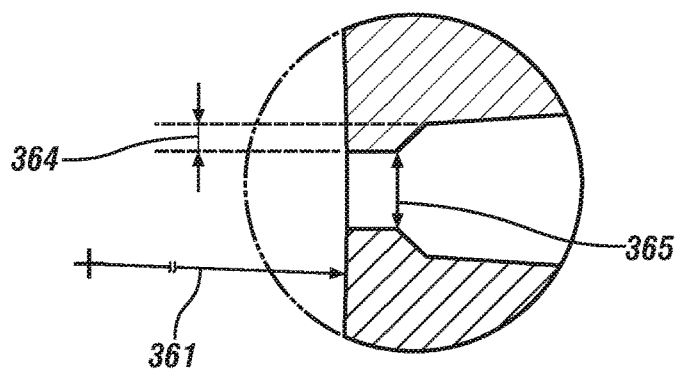

The stator 50 includes a plurality of stamped, ferrous laminate sheets 52. Each of the laminate sheets 52 is a disk-shaped device formed having a uniform thickness, and each has a centrally-located inner aperture 51 that is formed to dimensionally accommodate the outer diameter 29 of the rotor 20. Each of the laminate sheets 52 also includes a plurality of radially-oriented, inwardly-projecting teeth 56. The laminate sheets 52 are arranged in a stack such that the inner apertures 51 are aligned and the inwardly-projecting teeth 56 are aligned. The stacked laminate sheets 52 are assembled into a unitary device. A rotor opening 60 is formed by the aligned inner apertures 51 of the stacked laminate sheets 52, and a plurality of longitudinally-oriented slots 58 are formed between the aligned inwardly-projecting teeth 56 of the stacked laminate sheets 52. Additional details related to the plurality of longitudinally-oriented slots 58 are described in greater detail with reference to embodiments that are shown in FIGS. 3, 4A and 4B.

The slots 58 are configured to accommodate electrical windings 54 that are arranged in a distributed electrical winding assembly 70 that is fabricated with stranded conductive wire. The stranded conductive wire can be fabricated from suitable material, e.g., copper. External dimensions associated with the stator 50 include an outer diameter 59, which is preferably measured as an outside diameter of the stacked laminate sheets 52. An air gap 32 is formed between an outer peripheral surface of the rotor 20 and an inner peripheral surface of the stator 50.

Electrical windings 54 in the stator 50 are preferably arranged in a distributed winding configuration to provide a revolving electrical field arrangement that provides a rotating magnetic field in the stator 50 by applying a three-phase alternating current, which can be supplied by a power inverter, which is integrated into the package of the IPM electric machine 10 in one embodiment. During operation, electro-magnetic forces that are induced in the electrical windings 54 introduce magnetic flux that acts upon the permanent magnets 40 embedded in the rotor 20, thus exerting a torque to cause the rotor 20 to rotate about the rotor shaft 16. Alternating current (AC) motors can be divided generally into AC induction motors and AC synchronous motors. In a revolving field type of AC synchronous motor in which a stator is provided with armature windings and a rotor is provided with magnet windings, the rotor is changed to an electromagnet by excitation of the magnet windings of the rotor, and the rotor rotates by applying a three-phase alternating current to the stator. In applications wherein the electric power originates from a DC power supply, the three-phase alternating current is generated by the power inverter.

The electrical windings of the stator 50 are arranged with a selected quantity of electrical phases and a selected quantity of electrical turns per phase. Depending on the specific arrangement, the selected quantity of electrical phases is between 3 and 6, and the selected quantity of turns per phase is between 8 and 20.

Specific geometric design parameters associated with the rotor 20 and the stator 50 of the IPM electric machine 10 are identified, including a first set of geometric design parameters associated with the rotor 20 and a second set of geometric design parameters associated with the stator 50. The ranges for the first and second sets of geometric design parameters are selected to achieve motor operating parameters that include a high drive-cycle efficiency, e.g., greater than 90% peak efficiency over a wide operational area, a high torque density, a wide peak power range, a maximum speed of up to 18000 rpm and a low active material usage, i.e., minimizing the rare earth magnet mass.

The IPM electric machine 10 preferably includes a motor generator unit (MGU) having interior permanent magnets, with the MGU being driven by the power inverter that is supplied DC electric power from a DC power source. In one embodiment, the DC power source is a 48V DC device; alternatively, the DC power source may be a suitable voltage level, e.g., between 12V and 100V. A selected range of electrical phases is 3 to 6. A selected range of ratios of the outer diameter 59 of the stator 50 to active length of the rotor 20 is between 2 and 3.5 to achieve packaging constraints. In one embodiment, the outer diameter 59 of the stator 50 does not exceed 144 mm, and the stack length of the laminations of the rotor 20 does not exceed 60 mm. A selected quantity of turns per phase is between 8 and 20, a selected quantity of slots 58 in the stator 50 is between 60 and 96, and a selected quantity of stator winding layers is between 1 and 2. A selected quantity of poles is between 6 and 12. A selected normalized characteristic current with respect to peak current is between 0.35 and 0.7. A selected saliency ratio which is defined as q-axis inductance/d-axis inductance at a rated torque point is between 1.5 and 3. To prevent permanent demagnetization, the remnant flux density of the permanent magnets under an excitation current equal to three times short circuit current is greater than 0.1 T. Performance parameters of interest include maximizing torque quality, i.e., minimizing cogging and ripple, specifically to achieve a torque ripple that is less than 15% in one embodiment. Other performance parameters include minimizing drive cycle losses and maximizing efficiency, and minimizing permanent magnet demagnetization that is less than 75%, and minimizing losses associated with iron and copper.

FIG. 3 is a schematic cross-sectional cut-away end view of a fragment of an embodiment of the IPM electric machine 310, illustrating a single pole 322 of a rotor 320 mounted on a rotor shaft 316, and a corresponding portion of a stator 350, with an interposed air gap 332. The illustrated IPM electric machine 310 is configured as an 8-pole, 96-slot device. A pole axis 315 is shown, and is a radial line that passes through a geometric center of the single pole of the rotor 320 and a rotor center point 314, and also through the outer periphery 325. The stator 350 includes a plurality of radially inwardly projecting teeth 356 that are arranged to form inwardly-opening longitudinally-oriented slots 358 between adjacent pairs of the teeth, and electrical windings 354 that are arranged in a distributed electrical winding assembly (not illustrated in detail) that has been fabricated with stranded conductive wire and inserted into the slots 358. The inwardly opening slots 358 between adjacent teeth 356 are rectangularly-shaped in one embodiment. Alternatively, the inwardly opening slots 358 between adjacent teeth 356 are trapezoidally-shaped. The shape of the teeth 356 determine the shape of the slots 358. Additional details related to the stator 350 are illustrated and described with reference to FIGS. 4A and 4B.

The rotor 320 includes first and second pockets 326, 328, respectively, which are oriented along major axes 327, 329, respectively. The first and second pockets 326, 328 are oriented in relation to the pole axis 315 such that corresponding angles 330, 331 between the pole axis 315 and the major axes 327, 329, respectively, in relation to the outer periphery 325 of the rotor 320 are acute. In one embodiment, and as shown, the first and second pockets 326, 328 are oriented as mirror images in relation to the pole axis 315. First and second permanent magnets 340, 342 are inserted into the respective first and second pockets 326, 328, and thus are arranged in a V-configuration. The first and second permanent magnets 340, 342 are symmetric to and at equal angles to the pole axis 315. Additional details related to the rotor 320 are illustrated and described with reference to FIG. 5. As shown, the rotor 320 is arranged as an 8-pole device, a single one of which is shown.

The first and second sets of geometric design parameters associated with the rotor 20 and the stator 50 of the IPM electric machine 10 are described and detailed.

FIGS. 4A and 4B illustrate a schematic cross-sectional cut-away end view of a fragment of the stator 350 that is described with reference to FIG. 3, and are provided to illustrate the second set of geometric design parameters that are associated with an embodiment of the stator 350. A single slot 358 is formed between adjacent teeth 356, and portions are shown. A single radial line 352 is indicated.

Critical dimensions of the slot 358 and teeth 356 include:
$r_{so}$, which is a stator outside radius 360;
$r_{si}$, which is a stator inside radius 361;
$w_t$, which is a tooth body width 362;
$\alpha_s$, which is a slot angle 363;
$w_{tip}$, which is a tooth tip width 364;
$w_{so}$, which is a tooth tip slot width 365; and
$h_y$, which is a stator yoke length 366.

As shown, the indicated tooth body width 362 and tooth tip width 364 are half-widths.

Selected design parameters associated with the stator 350 include as follows:
a split ratio $k_{si}$, which is a ratio of the stator inside radius 361 and the stator outside radius 360;
a tooth width ratio $k_{wt}$, which is a ratio of the tooth body width 362 and the slot angle 363; and
a tooth tip length ratio $k_{wtt}$, which is a ratio of the tooth tip width 364 in relation to the slot width, which is a sum of the tooth tip width 364 and the tooth tip slot width 365.

Figure 5:
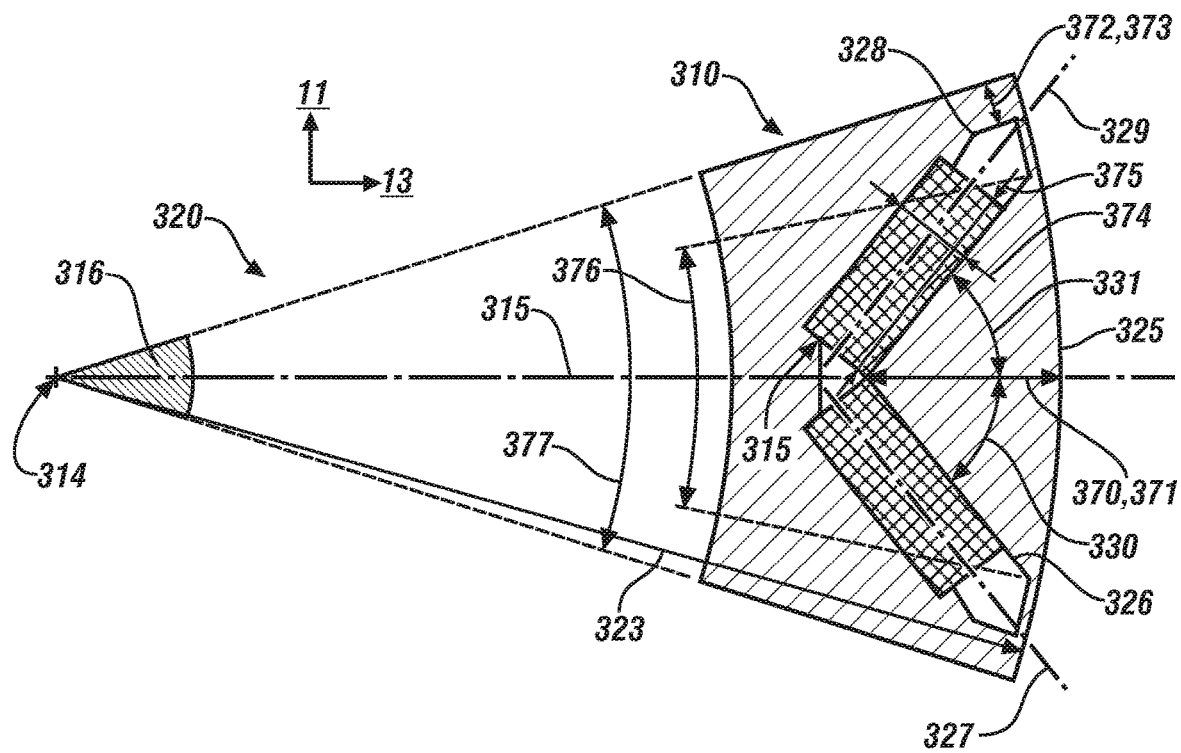
FIG. 5 is a schematic cross-sectional cut-away end view of a fragment of an embodiment of a rotor for the IPM electric machine, in accordance with the disclosure.

FIG. 5 illustrates a schematic cross-sectional cut-away end view of a fragment of the rotor 320 that is described with reference to FIG. 3, and is provided to illustrate the first set of geometric design parameters that are associated with this embodiment of the rotor 320. A schematic cross-sectional cut-away end view of a fragment of the rotor 320 that is described with reference to FIG. 3 is shown, including a single one of the poles 322. As previously described, the rotor 320 includes first and second pockets 326, 328, respectively, which are oriented along major axes 327, 329, respectively. The first and second pockets 326, 328 are oriented in relation to the pole axis 315 such that corresponding angles 330, 331 between the pole axis 315 and the major axes 327, 329, respectively, in relation to the outer periphery 325 of the rotor 320 are acute. In one embodiment, and as shown, the first and second pockets 326, 328 are oriented as mirror images in relation to the pole axis 315. First and second permanent magnets 340, 342 are inserted into the respective first and second pockets 326, 328, and thus are arranged in a V-configuration. The first and second permanent magnets 340, 342 are symmetric to and at equal angles to the pole axis 315.

Air pockets can be introduced around permanent magnet slots to reduce demagnetization of the permanent magnets 340, 342. Example air pockets are described with reference to FIG. 7. Rotor cut-outs can be made to reduce rotor weight and inertia. A central hole can be added to reduce permanent magnet flux leakage. Sharp edges can be filleted to reduce the concentration of mechanical stress especially on the bridges and the central post.

Dimensional parameters associated with the pole 322 include as follows:
$d_{pm}$, which is permanent magnet depth 370;
$d_{pm,max}$, which is maximum permanent magnet depth 371;
$w_q$, which is a width between adjacent magnets of different poles 372;
$w_{q,max}$, which is a maximum width between adjacent magnets of different poles 373;
$h_{pm}$, which is a height of a permanent magnet, i.e., a minor axis length 374;
$w_{pm}$, which is a length of the permanent magnet, i.e., a major axis length 375;
$\alpha_{pm}$, which indicates pole coverage by the permanent magnet 376; and
$\alpha_p$, which is total pole coverage 377.

The geometric design parameters associated with the rotor 320 include as follows:
$k_{dpm}$, which is a permanent magnet burial ratio;
$w_{dpm}$, which is a permanent magnet width ratio;
$k_{wq}$, which is a q-axis width ratio;
$h_g$, which a height of the air gap 332, measured as a radial distance between a rotor outer radius 323 and a stator inner radius 361; and
$\alpha_{pm}$, which is the permanent magnet pole coverage 376.

As shown, the indicated width between adjacent magnets of different poles 372 is a half-width.

Table 1 details selected ranges including minimum and maximum states (Min-Max) for the first set of geometric design parameters associated with the rotor (Rotor Parameters) and the second set of geometric design parameters associated with the stator (Stator Parameters) for embodiments related to FIGS. 4A, 4B and 5, which includes the first and second permanent magnets 340, 342 arranged in a V-configuration with regard to a respective pole axis 315. The embodiments include a 96 slot, 8 pole, V-configuration (96S8P-V), a 72 slot, 12 pole, V-configuration (72S12P-V) and a 60 slot, 10 pole, V-configuration (60S10P-V).

TABLE 1

| | | | 96S8P-V | 72S12P-V Range | 60S10P-V |
|---|---|---|---|---|---|
| | Description | Calculation | Min-Max | Min-Max | Min-Max |
| Stator Parameter | | | | | |
| $k_{si}$ | Split ratio | $r_{si}/r_{so}$ | 0.60-0.64 | 0.60-0.65 | 0.60-0.62 |
| $k_{wt}$ | Tooth width ratio | $w_t/\alpha_s$ | 0.56-0.60 | 0.53-0.60 | 0.60-0.6 |

TABLE 1-continued

| | Description | Calculation | 96S8P-V Min-Max | 72S12P-V Range Min-Max | 60S10P-V Min-Max |
|---|---|---|---|---|---|
| $k_{wtt}$ | Tooth tip length ratio | $w_{tip}/(w_{so} + w_{tip})$ | 0.11-0.21 | 0.20-0.43 | 0.31-0.44 |
| $k_{hy}$, Rotor Parameter | Yoke ratio | $h_y/r_{so}$ | 0.12-0.15 | 0.07-0.14 | 0.07-0.14 |
| $k_{dpm}$ | permanent magnet burial ratio | $d_{pm}/d_{pm,max}$ | 0.25-0.48 | 0.30-0.44 | 0.31-0.44 |
| $k_{wpm}$ | permanent magnet width ratio | $w_{pm}/w_{pm,max}$ | 0.85-0.93 | 0.83-0.92 | 0.88-0.93 |
| $k_{wq}$ | q-axis width ratio | $w_q/w_{q,max}$ | 0.52-0.87 | 0.50-0.88 | 0.52-0.89 |
| $rh_{pm}$ | Ratio of the permanent magnet | $h_{pm}/h_g$ | 8.73-14.10 | 8.76-12.54 | 8.66-13.34 |
| $k\alpha_{pm}$ (deg.) | pole coverage ratio | $\alpha_{pm}/\alpha_p$ | 0.63-0.75 | 0.61-0.66 | 0.62-0.67 |

Figure 6:
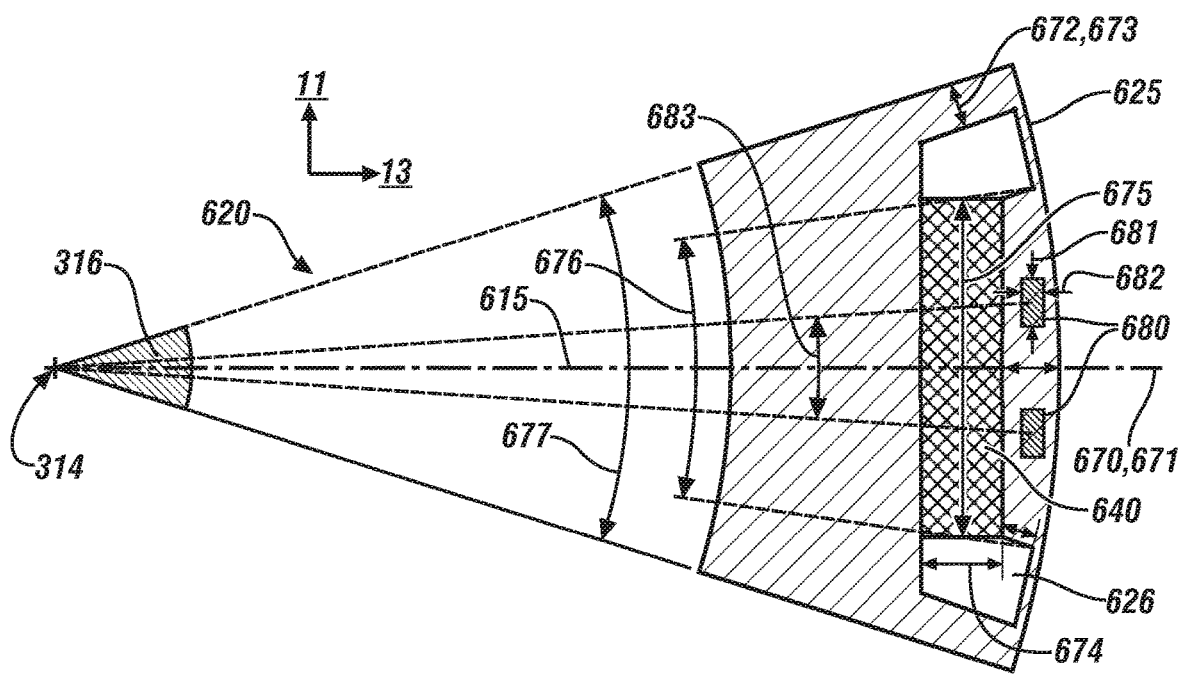
FIG. 6 is a schematic cross-sectional cut-away end view of a fragment of another embodiment of a rotor for the IPM electric machine, in accordance with the disclosure.

FIG. 6 illustrates a schematic cross-sectional cut-away end view of another embodiment of a rotor 620, and is provided to illustrate the first set of geometric design parameters that are associated with this embodiment of the rotor 620. The schematic cross-sectional cut-away end view includes a fragment of the rotor 620, including a fragment of the rotor 620 that is associated with a single pole. In this embodiment, the rotor 620 includes a single pocket 626 that houses a single permanent magnet 640, wherein a major axis 675 of the permanent magnet 640 is orthogonal to a pole axis 615. The outer periphery 625 is indicated. As shown, the rotor 620 is arranged as an 8-pole device, a single one of which is shown.

Critical dimensions associated with the single pole include as follows:

$d_{pm}$, which is permanent magnet depth 670;
$d_{pm,max}$, which is maximum permanent magnet depth 671;
$w_q$, which is a width between adjacent magnets of different poles 672;
$w_{q,max}$, which is a maximum width between adjacent magnets of different poles 673;
$h_{pm}$, which is a height of the permanent magnet, i.e., a minor axis length 674;
$w_{pm}$, which is a length of the permanent magnet, i.e., a major axis length 675;
$\alpha_{pm}$, which indicates the total pole coverage by the permanent magnet 676; and
$\alpha_p$, which is the total pole coverage 677.

Selected design parameters associated with the rotor 620 include as follows:

$d_{dpm}$, which is a permanent magnet burial depth;
$k_{wq}$, which is a q-axis width ratio;
$rh_{pm}$, which is a permanent magnet height ratio; and
$\alpha_{pm}$, which indicates the total pole coverage by the permanent magnet 676.

As shown, the indicated width between adjacent magnets of different poles 672 is a half-width.

The ranges for the first and second sets of geometric design parameters were identified through a large-scale optimization analysis. Table 2 details selected ranges including minimum and maximum states (Min-Max) for the first set of geometric design parameters associated with the rotor (Rotor Parameters) and the second set of geometric design parameters associated with the stator (Stator Parameters) for embodiments related to FIGS. 4A, 4B and 6, which includes the permanent magnets 640 being oriented orthogonal to a respective pole axis 615. The embodiments include a 96 slot, 8 pole, flat magnet configuration (96S8P-Flat), a 72 slot, 12 pole, flat magnet configuration (72S12P-Flat) and a 60 slot, 10 pole, flat magnet configuration (60S10P-Flat).

TABLE 2

| | Description | Calculation | 96S8P-Flat Min-Max | 72S12P-Flat Min-Max | 60S10P-Flat Min-Max |
|---|---|---|---|---|---|
| Stator Parameter | | | | | |
| $k_{si}$ | Split ratio | $r_{si}/r_{so}$ | 0.60-0.63 | 0.60-0.67 | 0.60-0.67 |
| $k_{wt}$ | Tooth width ratio | $w_t/\alpha_s$ | 0.54-0.60 | 0.55-0.60 | 0.53-0.60 |
| $k_{wtt}$ | Tooth tip length ratio | $w_{tip}/(w_{so} + w_{tip})$ | 0.12-0.23 | 0.20-0.39 | 0.32-0.45 |
| $k_{hy}$ Rotor | Yoke ratio | $h_y/r_{so}$ | 0.11-0.13 | 0.08-0.13 | 0.09-0.13 |

TABLE 2-continued

| Parameter | Description | Calculation | 96S8P-Flat Min-Max | 72S12P-Flat Min-Max | 60S10P-Flat Min-Max |
|---|---|---|---|---|---|
| $k_{dpm}$ | permanent magnet burial ratio | $d_{pm}/h_g$ | 1.75-6.67 | 1.86-7.10 | 1.70-9.67 |
| $k_{wq}$ | q-axis width ratio | $w_q/w_{q,max}$ | 0.50-0.69 | 0.52-0.74 | 0.51-0.72 |
| $rh_{pm}$ | permanent magnet height ratio | $h_{pm}/h_{pm,max}$ | 0.21-0.30 | 0.35-0.62 | 0.27-0.59 |
| $k\alpha_{pm}$ | pole coverage ratio | $\alpha_{pm}/\alpha_p$ | 0.57-0.73 | 0.63-0.68 | 0.61-0.67 |

In one embodiment, notches 680 in the form of voids can be introduced into the rotor 620 between the magnet 640 and the outer periphery 625 of the rotor 620. The notches 680 are preferably symmetrically arranged in pairs about the pole axis 615, and have parameters of width $w_n$ 681, height $h_n$ 682 and angle $\alpha_n$ 683. The notches are introduced to mitigate torque ripple. In one embodiment, a selected minimum-maximum range for a ratio between the height $h_n$ 682 and a radial height of the air gap $h_g$ is 1.65-2.85, a selected minimum-maximum range for a ratio between the width $w_n$ 681 and the radial height of the air gap $h_g$ is 2.65-7.50, and a selected minimum-maximum range for a ratio between the notch angle $\alpha_n$ 683 and the pole angle $\alpha_p$ 677 is 0.11-0.24.

Figure 7:
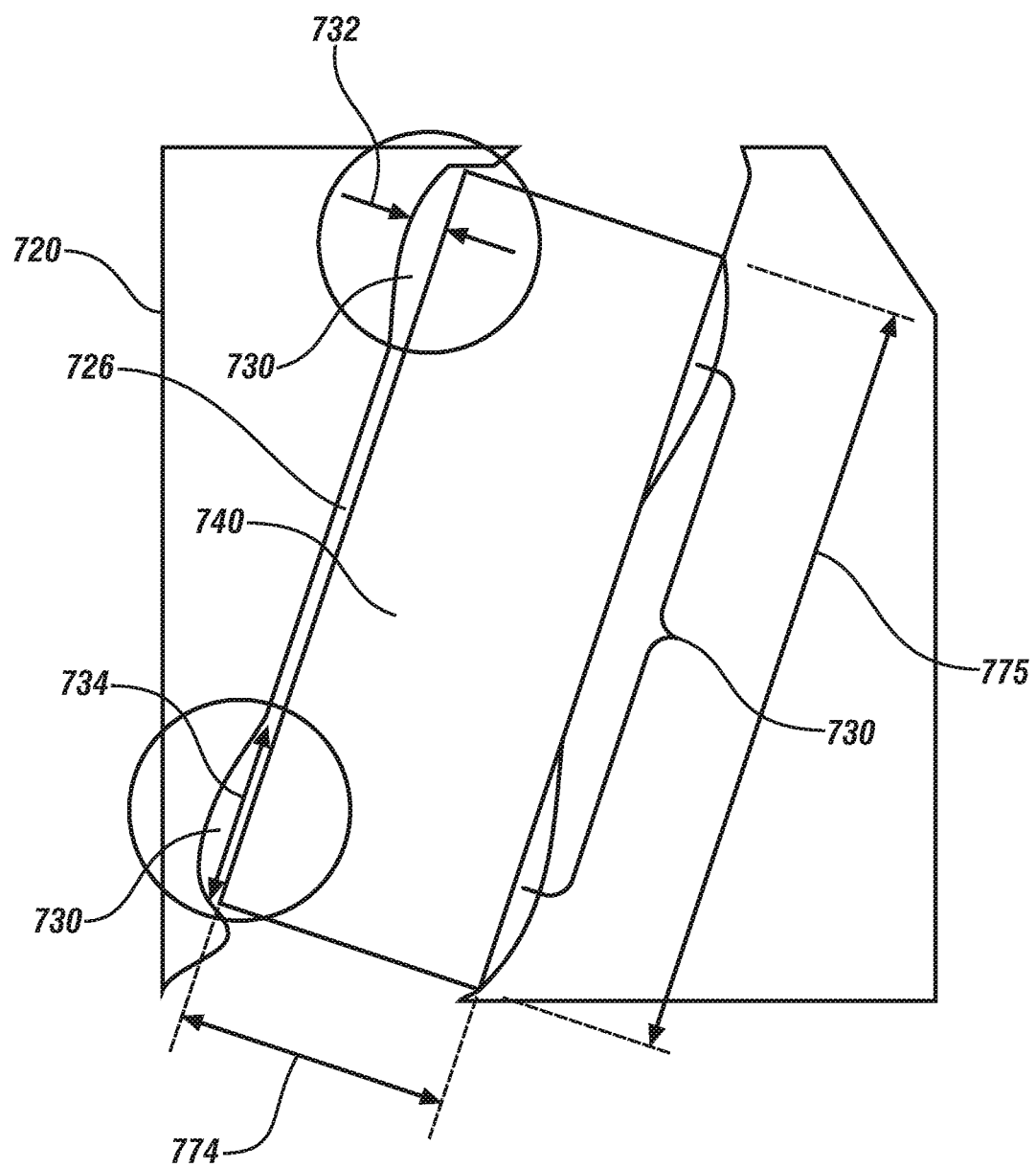
FIG. 7 is a schematic cross-sectional cut-away end view of a fragment of a rotor including a magnet housed therein for the IPM electric machine, in accordance with the disclosure.

FIG. 7 schematically shows a cross-sectional cut-away end view of a fragment of a rotor 720 including a single permanent magnet 740 housed therein for an embodiment of the IPM electric machine described herein. A pocket 726 is formed in the rotor 720, and the permanent magnet 740 is disposed therein. The permanent magnet 740 is configured as a rectangular prism that can be described in terms of a major axis length 775, a minor axis length 774, and a longitudinal axis (not shown). The pocket 726 is formed such that it includes a plurality of parabolically-shaped cavities 730 that are adjacent to edge portions of the permanent magnet 740, which are introduced to provide for protection against localized demagnetization of the permanent magnet 740. Each of the parabolically-shaped cavities 730 has a depth 732 and a length 734. The depth 732 of each of the cavities 730 is preferably set at 10-20% of the minor axis length 774, and the length 734 of each of the cavities 730 is preferably set at 15-30% of the major axis length 775. In one embodiment, the cavities 730 can be filled with a non-magnetic material.

Embodiments of the electric machine described herein are configured to simultaneously achieve operating parameters related to torque, speed, power, efficiency, packaging and other constraints, including operating with a 12V to 100V DC power source. The selected geometric design parameters associated with drive cycle efficiency and active material cost of the permanent magnets in the rotor have the following features. The rotor permanent magnets are configured as a simple V-arrangement or a flat-type to reduce either the mass of magnet, or to reduce the quantity of permanent magnet pieces utilized in the rotor. The selected states for the first and second sets of geometric design parameters are identified to ensure minimum usage of permanent magnets, while meeting other performance criteria such as torque density, high drive-cycle efficiency, protection against permanent demagnetization, and minimum torque ripple.

The rotor bridge thickness is preferably in a range between 0.8 mm and 1.5 mm to minimize leakage of magnet flux, increase power factor, minimize magnet usage, and at the same time to meet stress requirement at maximum operation speed, 18000-25000 rpm. When applicable, e.g. in the case of V-type layout, a central post can be introduced to the rotor body to increase mechanical robustness.

Multiple features are introduced to enhance the motor performance. These include the stator design being configured as distributed winding configuration, as opposed to fractional slot concentrated winding, for improved field weakening performance, reduced core losses, and for better overload thermal capability. The ranges of the geometric design parameters are identified to achieve low copper and core losses, high torque density, high drive-cycle efficiency, and minimum torque ripple.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A multi-phase, multi-pole electric interior permanent magnet motor/generator (IPM electric machine), comprising:
a rotor disposed on a rotor shaft and disposed within an annular stator, and a plurality of permanent magnets disposed in the rotor, wherein the stator includes a stator core and electrical windings arranged in a distributed winding configuration;
wherein the rotor includes a plurality of pockets that are disposed near an outer periphery of the rotor, and wherein the permanent magnets are disposed within the pockets;
wherein the rotor, the pockets and the permanent magnets conform to a first set of geometric design parameters;
wherein the permanent magnets are composed from rare earth materials;
wherein the stator includes a plurality of radially-inwardly projecting teeth configured to form inwardly-opening slots between adjacent pairs of the teeth;
wherein the teeth and slots conform to a second set of geometric design parameters;
wherein the ratio of an outer diameter of the stator to an active length of the rotor is between 2 and 3.5;
wherein the first and second sets of geometric design parameters are selected to achieve motor operating parameters comprising a high drive-cycle efficiency over a wide operational range, a high torque density, a wide peak power range, a maximum speed of 18000 rpm and minimize magnet material mass;
wherein the quantity of slots is between 60 and 96;
wherein the electrical windings are disposed within the slots of the laminate stack;
wherein the quantity of electrical poles is between 6 and 12;
wherein the quantity of electrical phases is between 3 and 6;
wherein the electrical windings include a quantity of turns per phase that is between 8 and 20;
wherein a normalized characteristic current of each phase of the distributed winding configuration is between 0.35 and 0.7 in relation to peak current
wherein a remnant flux density of the permanent magnets is greater than 0.1 T; and
wherein the second set of geometric design parameters associated with the stator include a split ratio, a tooth width ratio, a tooth tip length ratio and a yoke ratio associated with radially inwardly projecting teeth of the stator, wherein the split ratio has a magnitude between 0.60 and 0.67, wherein the tooth width ratio has a magnitude between 0.53 and 0.60, wherein the tooth tip length ratio has a magnitude between 0.11 and 0.45, and wherein the yoke ratio has a magnitude between 0.08 and 0.14.

2. The IPM electric machine of claim 1,
wherein each of the permanent magnets is a rectangular prism having a longitudinal axis and a rectangular cross-sectional area having a major axis and a minor axis;
wherein each of the plurality of pockets is disposed orthogonal to a radial line of the rotor and disposed to accommodate one of the permanent magnets; and
wherein each of the permanent magnets is disposed in a respective one of the pockets such that its major axis is orthogonal to the radial line of the rotor.

3. The IPM electric machine of claim 2, wherein the IPM electric machine is arranged as an 8-pole device, and the stator includes 96 slots, and wherein the first set of geometric design parameters associated with the rotor includes a permanent magnet burial ratio, a q-axis width ratio, a permanent magnet height ratio, and a pole coverage ratio, wherein the permanent magnet burial ratio is between 1.75 and 6.67, the q-axis width ratio is between 0.5 and 0.69, the permanent magnet height ratio is between 0.21 and 0.30, and the pole coverage ratio is between 0.57 and 0.73.

4. The 1PM electric machine of claim 2, wherein the IPM electric machine is arranged as a 12-pole device, and the stator includes 72 slots, and wherein the first set of geometric design parameters associated with the rotor include a permanent magnet burial ratio, a q-axis width ratio, a permanent magnet height ratio, and a pole coverage ratio, wherein the permanent magnet burial ratio is between 1.86 and 7.10, the q-axis width ratio is between 0.52 and 0.74, the permanent magnet height ratio is between 0.35 and 0.62, and the pole coverage ratio is between 0.63 and 0.68.

5. The IPM electric machine of claim 4, wherein the IPM electric machine is arranged as a 10-pole device, and the stator includes 60 slots, and wherein the first set of geometric design parameters associated with the rotor include a permanent magnet burial ratio, a q-axis width ratio, a permanent magnet height ratio, and a pole coverage ratio, wherein the permanent magnet burial ratio is between 1.70 and 9.67, the q-axis width ratio is between 0.51 and 0.72, the permanent magnet height ratio is between 0.27 and 0.59, and the pole coverage ratio is between 0.61 and 0.67.

6. The IPM electric machine of claim 1,
wherein each of the permanent magnets is a rectangular prism having a longitudinal axis and a rectangular cross-sectional area having a major axis and a minor axis;
wherein each of the plurality of pockets is disposed to accommodate one of the permanent magnets;
wherein adjacent pairs of the permanent magnets are arranged in a V-configuration such that an apex of the V-configuration is disposed on a radial line of the rotor and wherein the major axis of the permanent magnet is disposed at an acute angle relative to the radial line and the outer periphery of the rotor.

7. The IPM electric machine of claim 6, wherein the IPM electric machine is arranged as an 8-pole device, and the stator includes 96 slots, and wherein the first set of geometric design parameters associated with the rotor include a permanent magnet burial ratio, a permanent magnet width ratio, a q-axis width ratio, a permanent magnet height ratio, and a pole coverage ratio, wherein the permanent magnet burial ratio is between 0.25 and 0.48, the permanent magnet width ratio is between 0.85 and 0.93, the q-axis width ratio is between 0.52 and 0.87, the permanent magnet height ratio is between 8.73 and 14.10, and the pole coverage ratio is between 0.63 and 0.75.

8. The IPM electric machine of claim 6, wherein the IPM electric machine is arranged as a 12-pole device, and the stator includes 72 slots, and wherein the first set of geometric design parameters associated with the rotor include a permanent magnet burial ratio, a permanent magnet width ratio, a q-axis width ratio, a permanent magnet height ratio, and a pole coverage ratio, wherein the permanent magnet burial ratio is between 0.30 and 0.44 the permanent magnet width ratio is between 0.83 and 0.92, the q-axis width ratio is between 0.50 and 0.88, the permanent magnet height ratio is between 8.76 and 12.54, and the pole coverage ratio is between 0.61 and 0.66.

9. The IPM electric machine of claim 6, wherein the IPM electric machine is arranged as a 10-pole device, and the stator includes 60 slots, and wherein the first set of geometric design parameters associated with the rotor include a permanent magnet burial ratio, a permanent magnet width ratio, a q-axis width ratio, a permanent magnet height ratio, and a pole coverage ratio, wherein the permanent magnet burial ratio is between 0.31 and 0.44, the permanent magnet width ratio is between 0.88 and 0.93, the q-axis width ratio is between 0.52 and 0.89, the permanent magnet height ratio is between 8.66 and 13.34, and the pole coverage ratio is between 0.62 and 0.67.

10. The IPM electric machine of claim 1, wherein the slots between adjacent teeth in the stator are rectangularly-shaped.

11. The IPM electric machine of claim 1, wherein the slots between adjacent teeth in the stator are trapezoidally-shaped.

12. The IPM electric machine of claim 1, wherein a saliency ratio is within a range between 1.5 and 3.0.

13. The IPM electric machine of claim 1, wherein the rotor includes a plurality of laminate sheets that are disposed on the rotor shaft, wherein the plurality of laminate sheets include a plurality of voids that are disposed near the outer periphery of the rotor, and wherein the voids form the plurality of pockets.

14. The IPM electric machine of claim 1, wherein the plurality of pockets include a plurality of parabolically-shaped cavities adjacent to edge portions of the permanent magnet disposed therein, wherein each of the cavities has a depth that is 10-20% of the minor axis length of the magnet, and a length that is 15-30% of the major axis length of the permanent magnet.

15. The IPM electric machine of claim 1, wherein the rotor further includes a plurality of air pockets that are disposed around the pockets.

16. The IPM electric machine of claim 1, wherein the rotor further includes a plurality of notches that are disposed between the magnet and the outer periphery of the rotor.

17. A multi-phase, multi-pole electric interior permanent magnet motor/generator (IPM electric machine), comprising:

a rotor disposed on a rotor shaft and disposed within an annular stator, and a plurality of permanent magnets disposed in the rotor, wherein the stator includes a stator core and electrical windings arranged in a distributed winding configuration;

wherein the rotor includes a plurality of longitudinally-oriented pockets that are disposed near an outer periphery of the rotor, and wherein the permanent magnets are disposed within the pockets;

wherein the rotor, the pockets and the permanent magnets conform to a first set of geometric design parameters;

wherein the permanent magnets are composed from rare earth materials;

wherein the stator includes a plurality of radially-inwardly projecting teeth configured to form inwardly-opening longitudinally-oriented slots between adjacent pairs of the teeth;

wherein the teeth and slots conform to a second set of geometric design parameters;

wherein the quantity of slots is between 60 and 96;

wherein the electrical windings are disposed within the slots of the laminate stack;

wherein the quantity of electrical poles is between 6 and 12;

wherein the quantity of electrical phases is between 3 and 6;

wherein the electrical windings includes a quantity of turns per phase that is between 8 and 20;

wherein a normalized characteristic current of each phase of the distributed winding configuration is between 0.35 and 0.7 in relation to peak current;

wherein a remnant flux density of the permanent magnets is greater than 0.1 T;

wherein the ratio of an outer diameter of the stator to an active length of the rotor is between 2 and 3.5; and wherein the second set of geometric design parameters associated with the stator include a split ratio, a tooth width ratio, a tooth tip length ratio and a yoke ratio associated with radially inwardly projecting teeth of the stator, wherein the split ratio has a magnitude between 0.60 and 0.67, wherein the tooth width ratio has a magnitude between 0.53 and 0.60, wherein the tooth tip length ratio has a magnitude between 0.11 and 0.45, and wherein the yoke ratio has a magnitude between 0.08 and 0.14.

* * * * *